(12) United States Patent
Ogata

(10) Patent No.: US 11,601,556 B1
(45) Date of Patent: Mar. 7, 2023

(54) IMAGE FORMING APPARATUS

(71) Applicant: FUJIFILM Business Innovation Corp., Tokyo (JP)

(72) Inventor: Kenta Ogata, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/542,503

(22) Filed: Dec. 6, 2021

(30) Foreign Application Priority Data

Aug. 23, 2021 (JP) .............................. JP2021-135422

(51) Int. Cl.
*G06K 15/00* (2006.01)
*H04N 1/00* (2006.01)
*G01S 17/08* (2006.01)

(52) U.S. Cl.
CPC ..... *H04N 1/00037* (2013.01); *H04N 1/00087* (2013.01); *H04N 1/00352* (2013.01); *H04N 1/00896* (2013.01); *G01S 17/08* (2013.01); *H04N 2201/0094* (2013.01)

(58) Field of Classification Search
CPC ................ G01S 17/08; H04N 1/00037; H04N 1/00087; H04N 1/00352; H04N 1/00896; H04N 2201/0094
See application file for complete search history.

(56) References Cited

U.S. PATENT DOCUMENTS

2013/0128298 A1* 5/2013 Yamada ............. H04N 1/00496
358/1.13
2018/0031700 A1* 2/2018 Horishita ................ G01S 15/04

FOREIGN PATENT DOCUMENTS

JP         2012203131      10/2012

* cited by examiner

*Primary Examiner* — Moustapha Diaby
(74) *Attorney, Agent, or Firm* — JCIPRNET

(57) ABSTRACT

An image forming apparatus includes: an operation unit that is decentered from a center line between a right part and a left part of the image forming apparatus rightwards or leftwards and that is disposed closer to a rear face or a front face of the image forming apparatus; a human sensor that detects a user intending to use the image forming apparatus; and a controller that performs control of operation of the image forming apparatus by using a detection result of the human sensor, the human sensor having a detection range set to detect the user, the user being detectable even when the user is present at least partially outside a width range of the image forming apparatus.

14 Claims, 16 Drawing Sheets

IMAGE FORMING APPARATUS

CROSS-REFERENCE TO RELATED APPLICATIONS

This application is based on and claims priority under 35 USC 119 from Japanese Patent Application No. 2021-135422 filed Aug. 23, 2021.

BACKGROUND

(i) Technical Field

The present disclosure relates to an image forming apparatus.

(ii) Related Art

Japanese Unexamined Patent Application Publication No. 2012-203131 discloses an image processing apparatus that reduces unnecessary power consumption in the following manner. In response to a human sensor detecting a moving body (user), power is supplied from a commercial power supply, and whether to enter a standby mode by supplying power to devices and other components or enter a sleep mode again is determined on the basis of the state of the moving body.

SUMMARY

An image forming apparatus includes a human sensor that detects a user and performs control of the operation of the image forming apparatus by using a detection result of the human sensor. If an operation unit such as an operation panel is decentered from a center line between the right part and the left part of the image forming apparatus and is disposed closer to the front face of the image forming apparatus, the user performs operation on the operation unit with their body partially outside the width range of the image forming apparatus. There is thus a possibility that detection of the user by the human sensor results in failure.

Aspects of non-limiting embodiments of the present disclosure relate to an image forming apparatus enabled to detect a user not completely included within the width range of the image forming apparatus having an operation unit that is decentered rightwards or leftwards from the center line between the right part and the left part of the image forming apparatus and that is disposed closer to a rear face or a front face of the image forming apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including: an operation unit that is decentered from a center line between a right part and a left part of the image forming apparatus rightwards or leftwards and that is disposed closer to a rear face or a front face of the image forming apparatus; a human sensor that detects a user intending to use the image forming apparatus; and a controller that performs control of operation of the image forming apparatus by using a detection result of the human sensor, the human sensor having a detection range set to detect the user, the user being detectable even when the user is present at least partially outside a width range of the image forming apparatus.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure will be described in detail with reference to the drawings.

Figure 1:
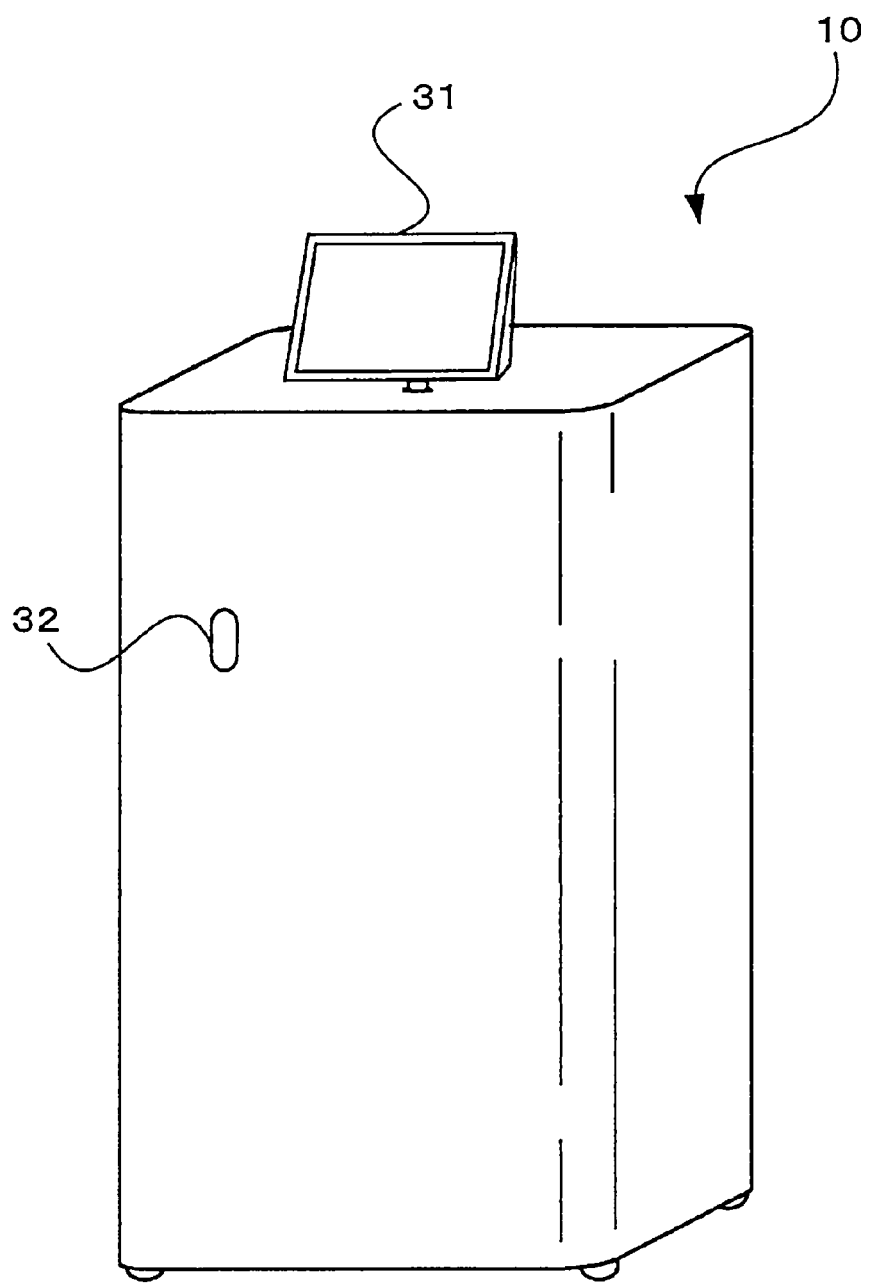
FIG. 1 is a view of the external appearance of an image forming apparatus of the exemplary embodiment of the present disclosure for explaining the schematic configuration of the image forming apparatus.

FIG. 1 is a view of the external appearance of an image forming apparatus 10 of the exemplary embodiment of the present disclosure for explaining a schematic configuration of the image forming apparatus 10. FIG. 1 illustrates only components related to the description of the present disclosure and omits the other components.

The image forming apparatus 10 is an image forming apparatus called a multifunction printer having multiple functions such as a printing function, a scanning function, a copying function, and a faxing function. The image forming apparatus 10 includes an operation panel 31 in the upper part of the image forming apparatus 10. The operation panel 31 receives operation by a user and displays various pieces of information to the user. The image forming apparatus 10 includes a human sensor 32 that detects the user intending to use the image forming apparatus 10. The human sensor 32 is installed in the left part of the front face of the image forming apparatus 10.

Figure 2:
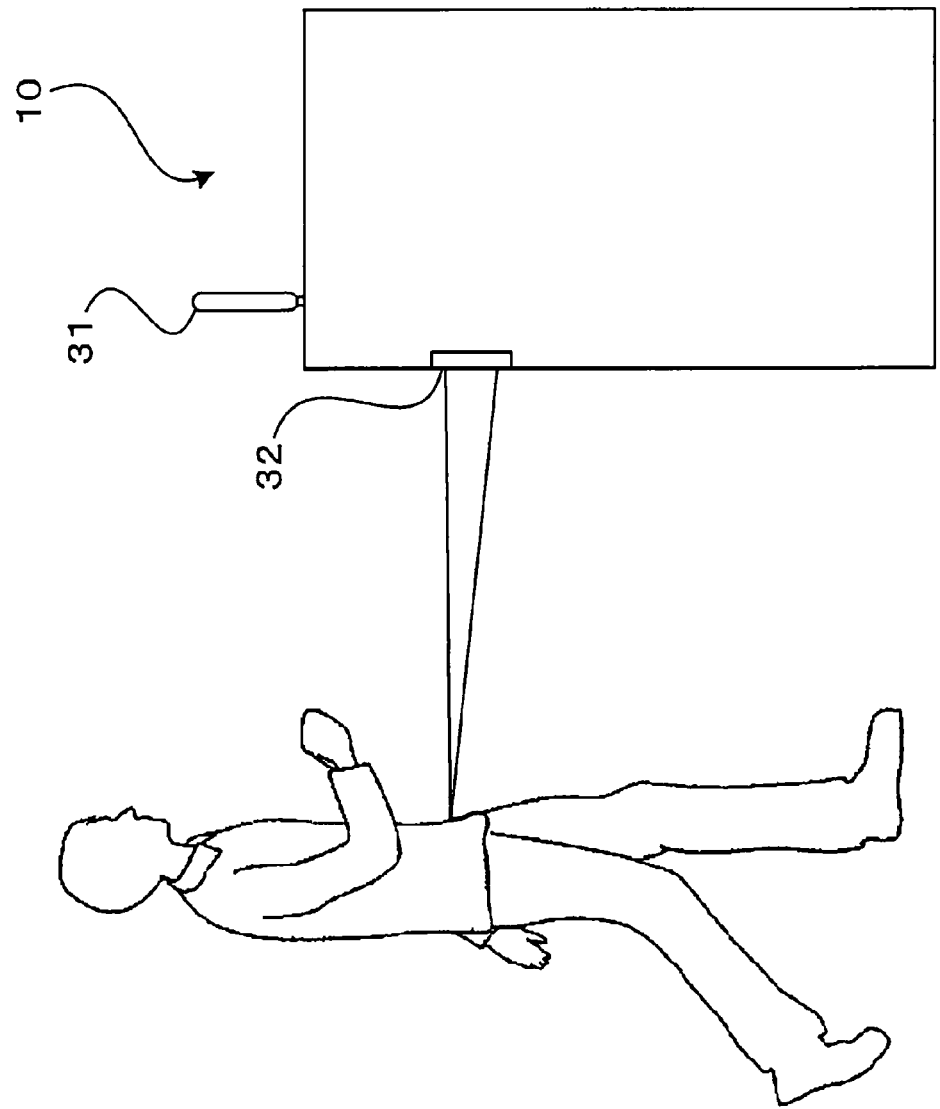
FIG. 2 is a view illustrating a state where a human sensor detects a user approaching the image forming apparatus to use the image forming apparatus.

As the human sensor 32, for example, a distance measuring sensor capable of detecting a distance to the user by detecting reflected radiated light is usable. FIG. 2 illustrates a state where the human sensor 32 detects the user approaching the image forming apparatus 10 to use the image forming apparatus 10. As illustrated in FIG. 2, since the user typically approaches the disposition position of the operation panel 31, the human sensor 32 is thus set to detect the user moving in this manner.

In the description for this exemplary embodiment, the distance measuring sensor is used as the human sensor 32; however, any sensor capable of detecting a user intending to use the image forming apparatus 10 may be used.

The image forming apparatus 10 of this exemplary embodiment performs control to, for example, restore the mode of the image forming apparatus 10 from an energy save mode to a normal operation mode in response to the human sensor 32 detecting the user intending to use the image forming apparatus 10.

Figure 3:
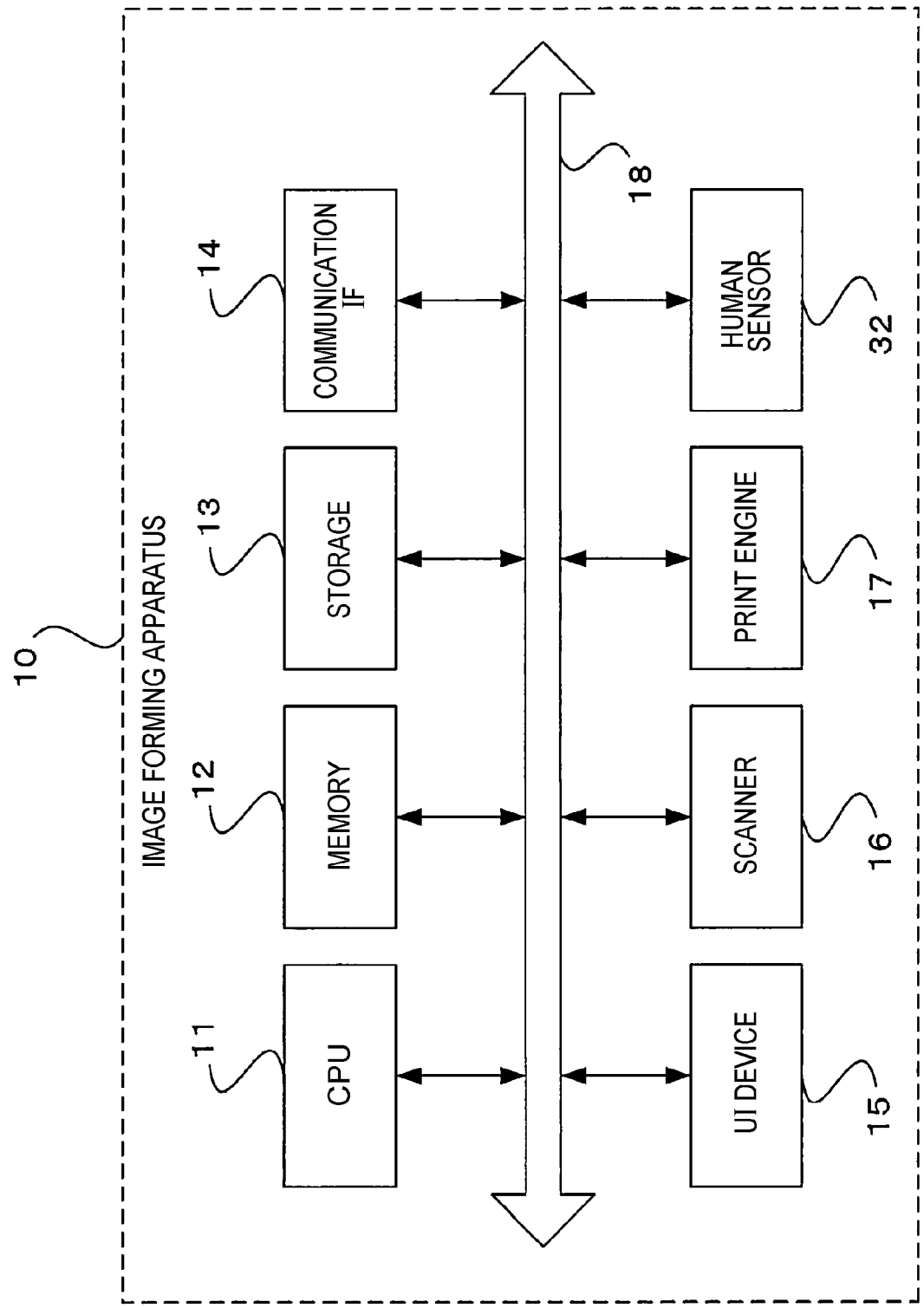
FIG. 3 is a diagram illustrating the hardware configuration of the image forming apparatus of the exemplary embodiment of the present disclosure.

FIG. 3 illustrates the hardware configuration of the image forming apparatus 10 of this exemplary embodiment.

As illustrated in FIG. 3, the image forming apparatus 10 includes a central processing unit (CPU) 11, a memory 12, a storage 13 such as a hard disk drive, a communication interface (IF) 14 that exchanges data with an external apparatus via a network, a user interface (UI) device 15 including either a touch panel or a liquid crystal display and a keyboard, a scanner 16, a print engine 17, and the human sensor 32. These components are connected to each other via a control bus 18.

The CPU 11 is a processor configured to execute a predetermined process on the basis of a control program stored in the memory 12 or the storage 13 and performs control of the operation of the image forming apparatus 10. In the description for this exemplary embodiment, the CPU 11 reads out and runs the control program stored in the memory 12 or the storage 13, but the program may be provided to the CPU 11 in such a manner as to be stored in a storage medium such as a compact disc read-only memory (CD-ROM).

Figure 4:
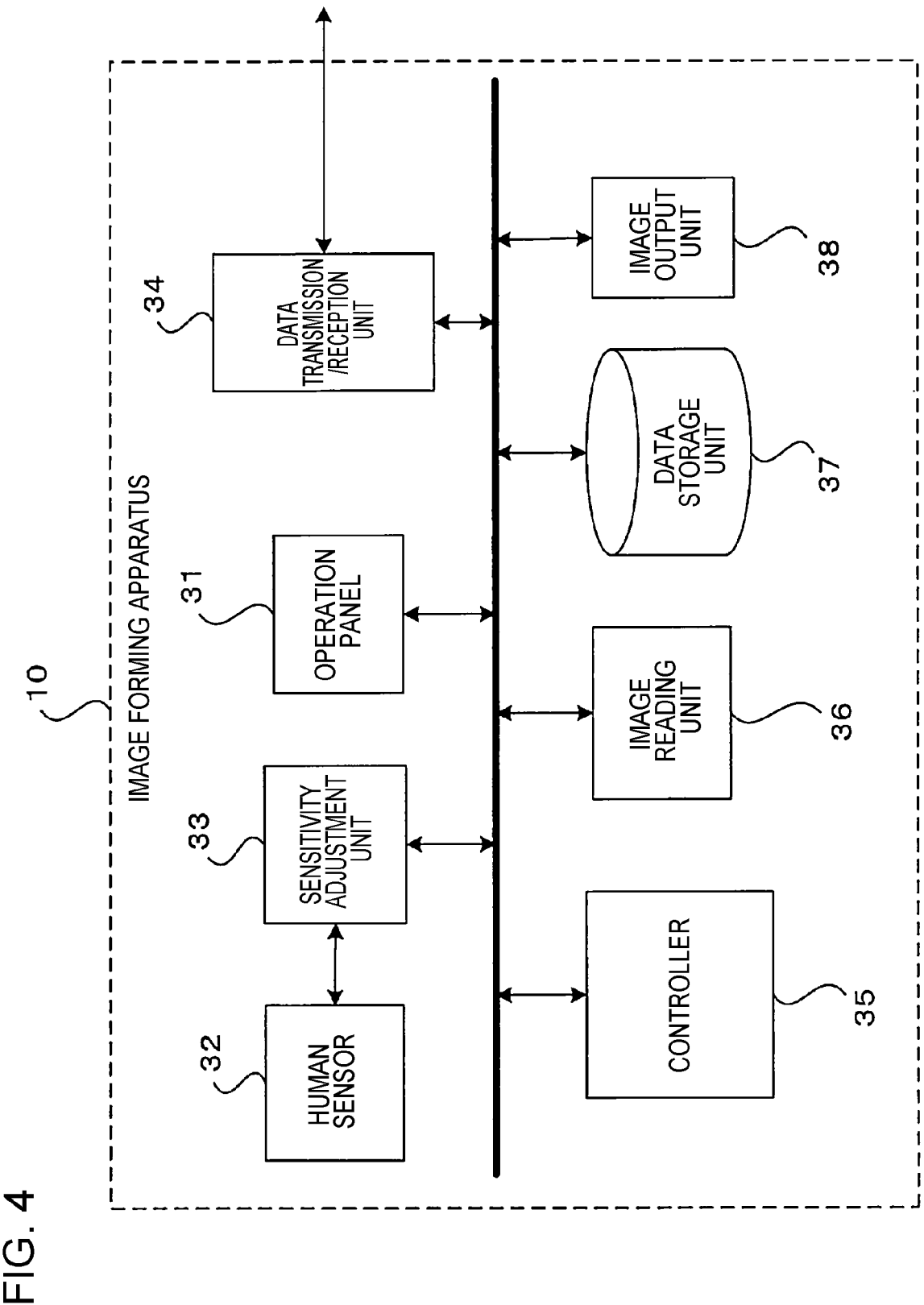
FIG. 4 is a block diagram illustrating the functional configuration of the image forming apparatus of the exemplary embodiment of the present disclosure.

FIG. 4 is a block diagram illustrating the functional configuration of the image forming apparatus 10 implemented by running the control program described above.

As illustrated in FIG. 4, the image forming apparatus 10 of this exemplary embodiment includes the human sensor 32, a sensitivity adjustment unit 33, the operation panel 31, a data transmission/reception unit 34, a controller 35, an image reading unit 36, a data storage unit 37, and an image output unit 38.

The data transmission/reception unit 34 exchanges data with an external apparatus such as a terminal apparatus. The controller 35 generates printing data on the basis of a print job received from the external apparatus via the data transmission/reception unit 34 and performs control to output the generated printing data from the image output unit 38. The data storage unit 37 stores various pieces of data such as the printing data generated by the controller 35.

The operation panel 31 is controlled by the controller 35 and functions as an operation unit that displays various pieces of information to the user and that inputs various pieces of information regarding operation performed by the user.

The image output unit 38 outputs an image on the recording medium such as a printing sheet under the control of the controller 35. The image reading unit 36 reads a document image from a set document under the control of the controller 35.

The human sensor 32 detects the user intending to use the image forming apparatus 10 as described above. The sensitivity adjustment unit 33 adjusts the detection sensitivity of the human sensor 32.

The controller 35 performs control of the operation of the image forming apparatus 10 by using the result of the detection by the human sensor 32. Specifically, in response to a distance to the user measured by the human sensor 32 becoming shorter than or equal to a distance set in advance, the controller 35 performs control to restore the mode of the image forming apparatus 10 from the energy save mode to the normal operation mode. The term "normal operation mode" denotes a state where power is supplied to the units of the image forming apparatus 10 and where the functions of the image forming apparatus 10 are usable. The term "energy save mode" denotes a state where power supply to the units of the image forming apparatus 10 is partially stopped to cause power consumption lower than that in the normal operation mode.

The disposition position of the operation panel 31 in this exemplary embodiment may be changed in accordance with the intention of the user. Specifically, this exemplary embodiment has a configuration in which the operation panel 31 may be centered at the center line between the right part and the left part of the top face of the image forming apparatus 10 and disposed closer to the front edge or the rear edge of the top face and a configuration in which the operation panel 31 may be decentered from the center line rightwards or leftwards and disposed closer to the front edge or the rear edge.

Note that this exemplary embodiment includes not only the configurations in which the disposition position of the operation panel 31 is changeable but also a configuration in which the disposition position of the operation panel 31 is unchangeable and is originally decentered from the center line. In other words, this exemplary embodiment includes a configuration in which the operation panel 31 with its disposition position unchangeable is disposed in such a manner that the disposition position is unchangeable to the positions: centered at the center line of the top face of the image forming apparatus 10 and closer to the front edge or the rear edge of the top face; and decentered from the center line rightwards or leftwards and closer to the front edge or the rear edge.

In the case where the operation panel 31 is decentered from the center line rightwards or leftwards and is disposed closer to the rear edge or the front edge of the image forming apparatus 10, the detection range of the human sensor 32 is set to detect the user even when the user is present at least partially outside the width range of the image forming apparatus 10. In addition, in the case where the operation panel 31 is originally decentered from the center line rightwards or leftwards and disposed closer to the rear edge or the front edge of the image forming apparatus 10, the detection range of the human sensor 32 is also set to detect the user present at least partially outside the width range of the image forming apparatus 10.

For example, the detection direction of the human sensor 32 is changeable, and the detection range in which the user present at least partially outside the width range of the image forming apparatus 10 is detectable is settable by changing the detection direction.

The detection direction of the human sensor 32 may be changed stepwise to a detection direction selected from multiple detection directions, with stepless changing not being allowed.

The image forming apparatus 10 may further include a changing device that changes the direction of detection by the human sensor 32. The controller 35 may detect the disposition position of the operation panel 31 and automatically set the detection range based on the disposition position of the operation panel 31 by controlling the changing device on the basis of the disposition position of the operation panel 31.

After the detection direction of the human sensor 32 is changed, there is a possibility that the detection sensitivity is no longer optimum. The sensitivity adjustment unit 33 may thus adjust the detection sensitivity of the human sensor 32 after the detection direction of the human sensor 32 is decided.

The state where the user is present at least partially outside the width range of the image forming apparatus 10 denotes the following state. When the body of the user is projected onto the front face of the image forming apparatus 10, the entire outer shape or at least part of the outer shape of the projected body of the user is outside the width range of the image forming apparatus 10.

In the description above, the detection direction of the human sensor 32 is changeable; however, this exemplary embodiment includes a case where the detection direction of the human sensor 32 is unchangeable because the detection direction is fixed. In the case where the detection direction of the human sensor 32 is fixed as described above, the detection range of the human sensor 32 may also be changed by changing the detection sensitivity.

States where the detection direction of the human sensor 32 is set in the image forming apparatus 10 of this exemplary embodiment on the basis of the disposition position of the operation panel 31 will then be described in detail with reference to the drawings.

Figure 5:
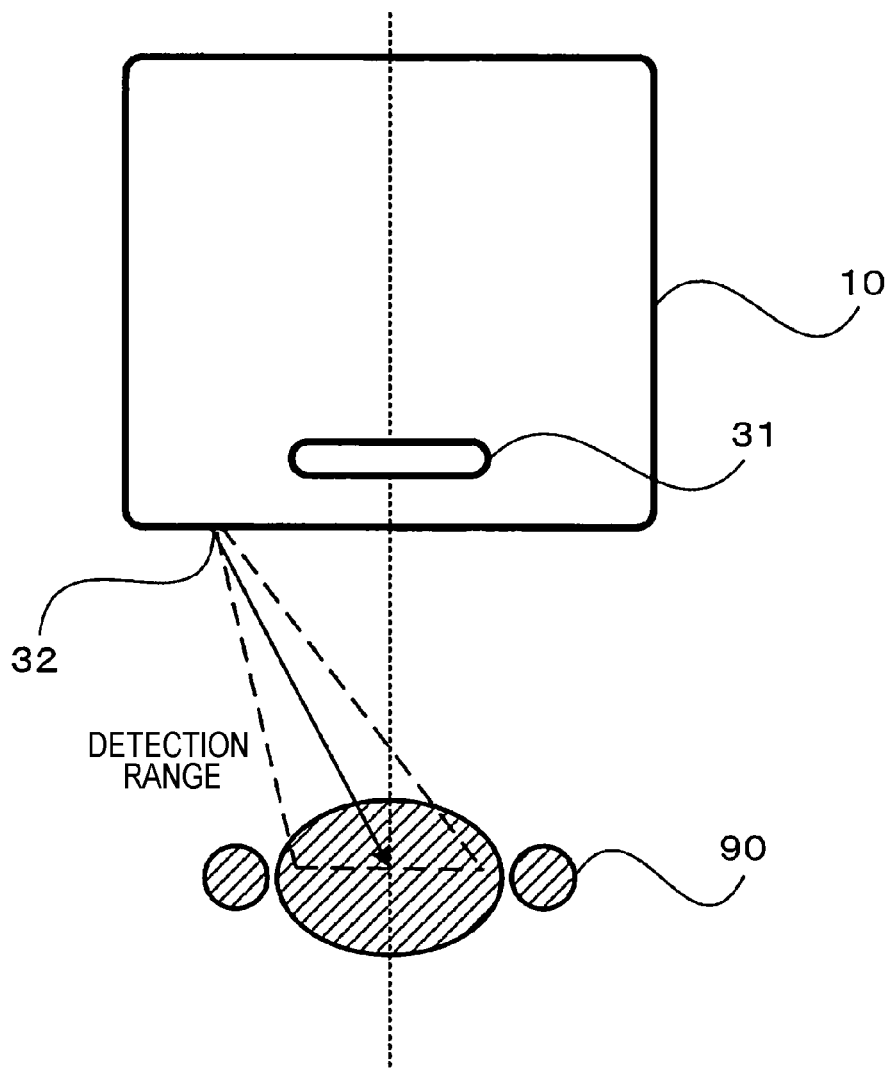
FIG. 5 is a view illustrating the direction of detection by the human sensor with an operation panel centered at the center line between the right part and the left part of the image forming apparatus and disposed closer to the front face of the image forming apparatus.

First, FIG. 5 illustrates the detection direction of the human sensor 32 with the operation panel 31 centered at the center line and disposed closer to the front edge of the image forming apparatus 10. FIG. 5 is a top view of the image forming apparatus 10.

With reference to FIG. 5, it is understood that the detection range of the human sensor 32 is set to be centered at a position near a point of the center line of the image forming apparatus 10 because the operation panel 31 is centered at the center line and disposed closer to the front edge of the image forming apparatus 10. It is understood that a user 90 intending to operate the operation panel 31 overlaps with the detection range of the human sensor 32.

Typically, the user often operates the operation panel 31, standing in front of the operation panel 31. When moving from a different place to the image forming apparatus 10, the user often moves toward the operation panel 31. Accordingly, in a case where the operation panel 31 is centered at the center line and disposed closer to the front edge of the image forming apparatus 10, setting the detection range of the human sensor 32 to detect a position near a point of the center line of the image forming apparatus 10 is highly likely to lead to detection of the user intending to use the image forming apparatus 10.

Figure 6:
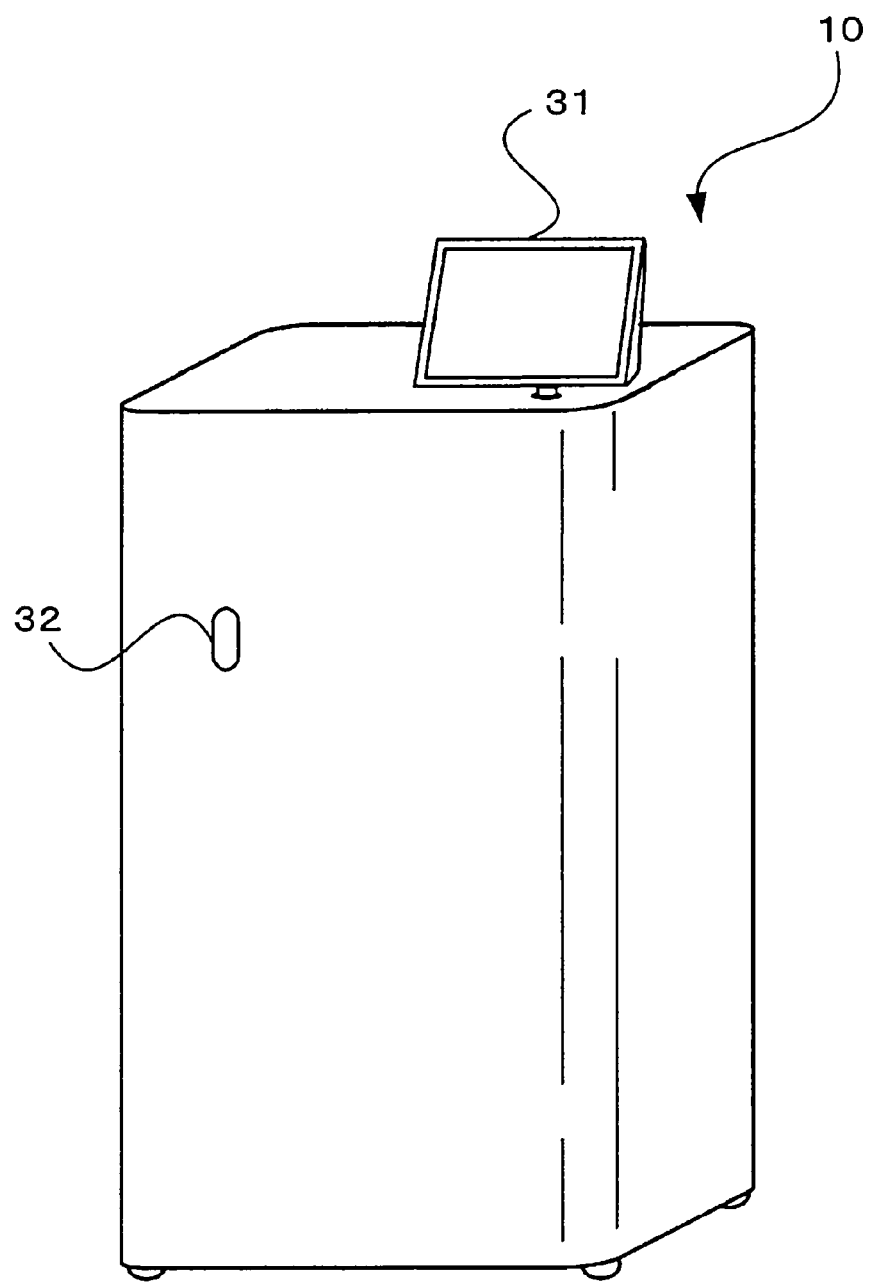
FIG. 6 is a view of the external appearance of the image forming apparatus with the operation panel disposed in the right part and closer to the front face.

A case where the operation panel 31 is disposed in the right part and closer to the front edge will be described with reference to FIG. 6. With reference to FIG. 6, it is understood that the operation panel 31 is decentered from the center line rightwards and disposed closer to the front edge of the top face of the image forming apparatus 10 viewed from the front face.

Figure 7:
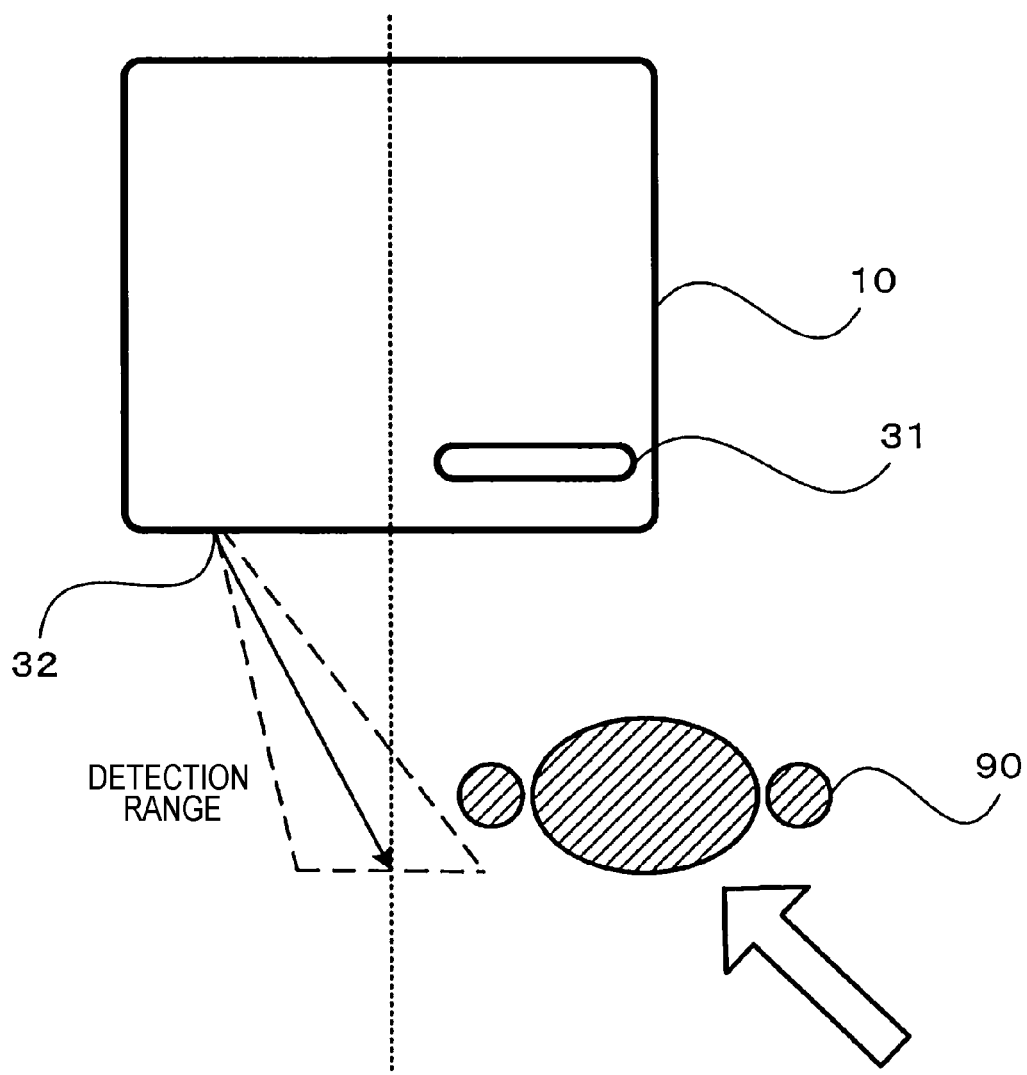
FIG. 7 is a view illustrating a state where the detection direction of the human sensor is not changed from that in FIG. 5, with the operation panel disposed in the right part and closer to the front face.

FIG. 7 illustrates a state where the detection direction of the human sensor 32 is not changed from that in FIG. 5, with the operation panel 31 disposed in the right part and closer to the front edge.

With reference to FIG. 7, it is understood that the detection direction of the human sensor 32 is set toward a range centered at a position near a point of the center line of the image forming apparatus 10 and thus the user 90 intending to operate the operation panel 31 disposed in the right part is outside the detection range.

As described above, a user typically approaches the image forming apparatus 10 aiming at the operation panel 31 in many cases. If the user 90 moves in such a way as represented by the arrow in FIG. 7, the user 90 arrives at the position in front of the operation panel 31 without any chance to enter the detection range of the human sensor 32.

This does not cause automatic restoration of the image forming apparatus 10 to the normal operation mode, and thus the user needs to operate the power button or the like to restore the image forming apparatus 10 from the energy save mode to the normal operation mode. It takes some time to start using the image forming apparatus 10.

In the image forming apparatus 10 of this exemplary embodiment, the detection direction and the detection range of the human sensor 32 are thus set on the basis of the disposition position of the operation panel 31.

Figure 8:
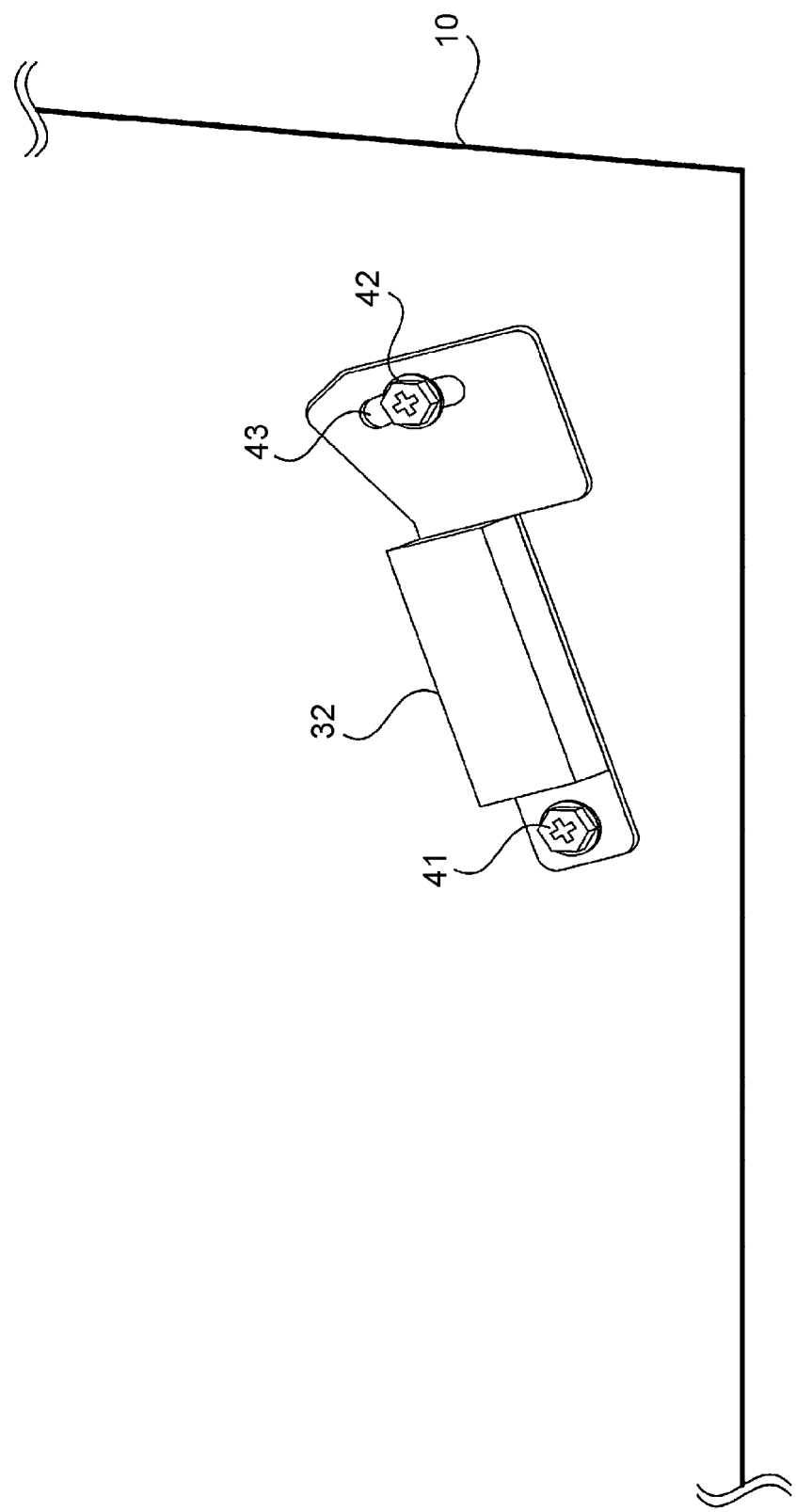
FIG. 8 is a view for explaining a human sensor in a structure in which the detection direction is mechanically changeable.

For example, the human sensor 32 in this exemplary embodiment has a structure as illustrated in FIG. 8 in which the detection direction is mechanically changeable. Note that FIG. 8 is a partially enlarged view of the structure inside the image forming apparatus 10 and does not represent the external appearance of the image forming apparatus 10. In the structure in FIG. 8, the human sensor 32 rotates around a screw 41 in response to the change of the positional relationship between a screw 42 and the human sensor 32 in the range of a long hole 43. The change is caused by loosening the screws 41 and 42.

Figure 9:
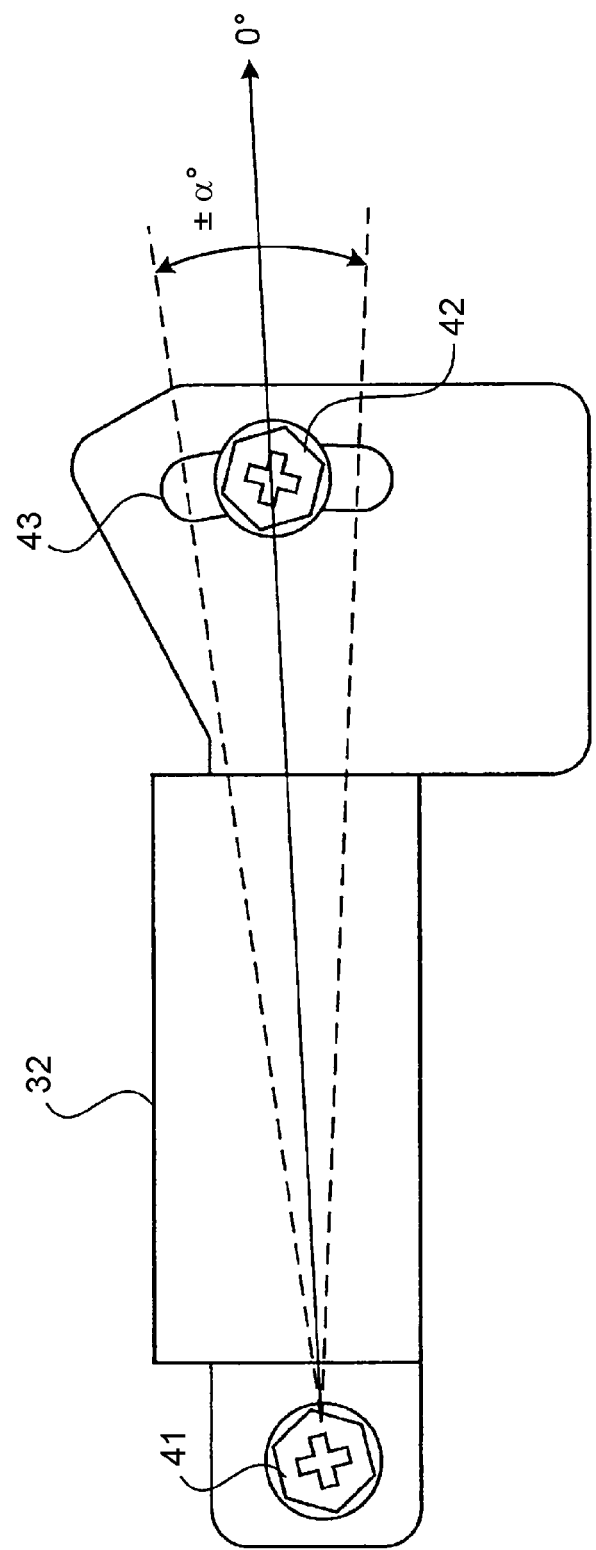
FIG. 9 is a view for explaining a state where the human sensor illustrated in FIG. 8 has a detection direction changeable in the range of plus or minus a degrees with respect to a reference direction set in advance.

As the result, as illustrated in FIG. 9, the detection direction of the human sensor 32 is changeable, for example, in the range of plus or minus a degrees with respect to the reference direction set in advance.

Figure 10:
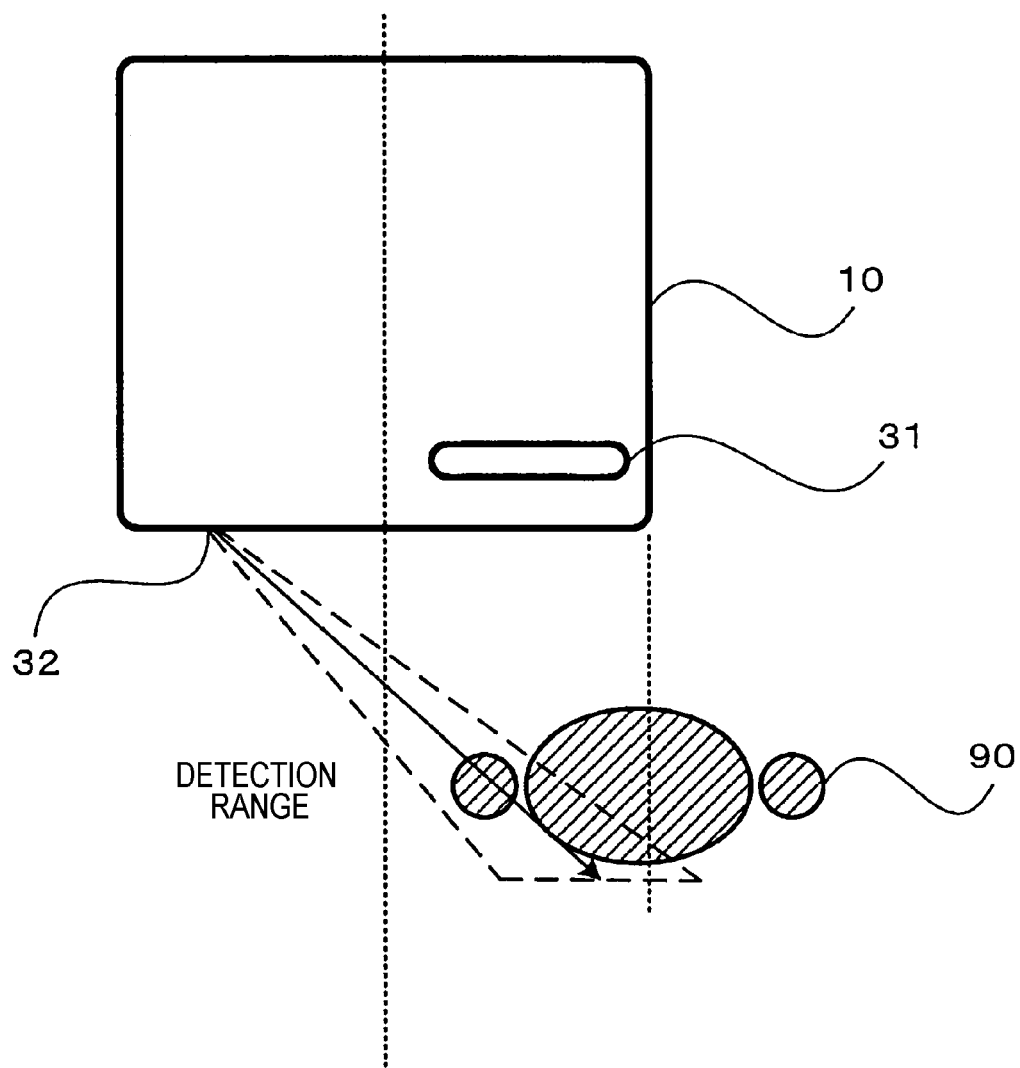
FIG. 10 is a view for explaining a state after the detection direction of the human sensor is changed to the right direction because the operation panel is disposed in the right part of the upper part of the image forming apparatus and closer to the front face.

FIG. 10 illustrates a state where the detection direction of the human sensor 32 is changed on the basis of the disposition position of the operation panel 31 due to the variable detection direction as described above.

With reference to FIG. 10, it is understood that the detection direction of the human sensor 32 is changed to the right direction because the operation panel 31 is disposed in the right part of the image forming apparatus 10 and closer to the front edge of the upper part. As the result, even if the user 90 intends to operate the operation panel 31 decentered from the image forming apparatus 10 rightwards and is thus present at least partially outside the width range of the image forming apparatus 10, the user 90 is detectable by the human sensor 32.

If the user 90 is present at the position where the user 90 is able to operate the operation panel 31 within their reach, the detection range of the human sensor 32 may be set to partially overlap with the body of the user 90 from the viewpoint of detection accuracy. Nevertheless, to minimize wrong detection, the detection range of the human sensor 32 may be set within the width range of the image forming apparatus 10.

As described above, the state where the user is present at least partially outside the width range of the image forming apparatus 10 denotes the following state. When the body of the user is projected onto the front face of the image forming apparatus 10, the entire outer shape or at least part of the outer shape of the projected body of the user is outside the width range of the image forming apparatus 10. FIG. 10 illustrates a state where a right part of the user 90 is outside the width range of the image forming apparatus 10.

If the detection direction of the human sensor 32 is not changeable, but if the operation panel 31 and the human sensor 32 have the positional relationship as in FIG. 10, the detection range of the human sensor 32 may be set as in FIG. 10.

If the detection direction of the human sensor 32 is changed as described above, the sensitivity adjustment unit 33 may adjust the detection sensitivity of the human sensor 32.

Figure 11:
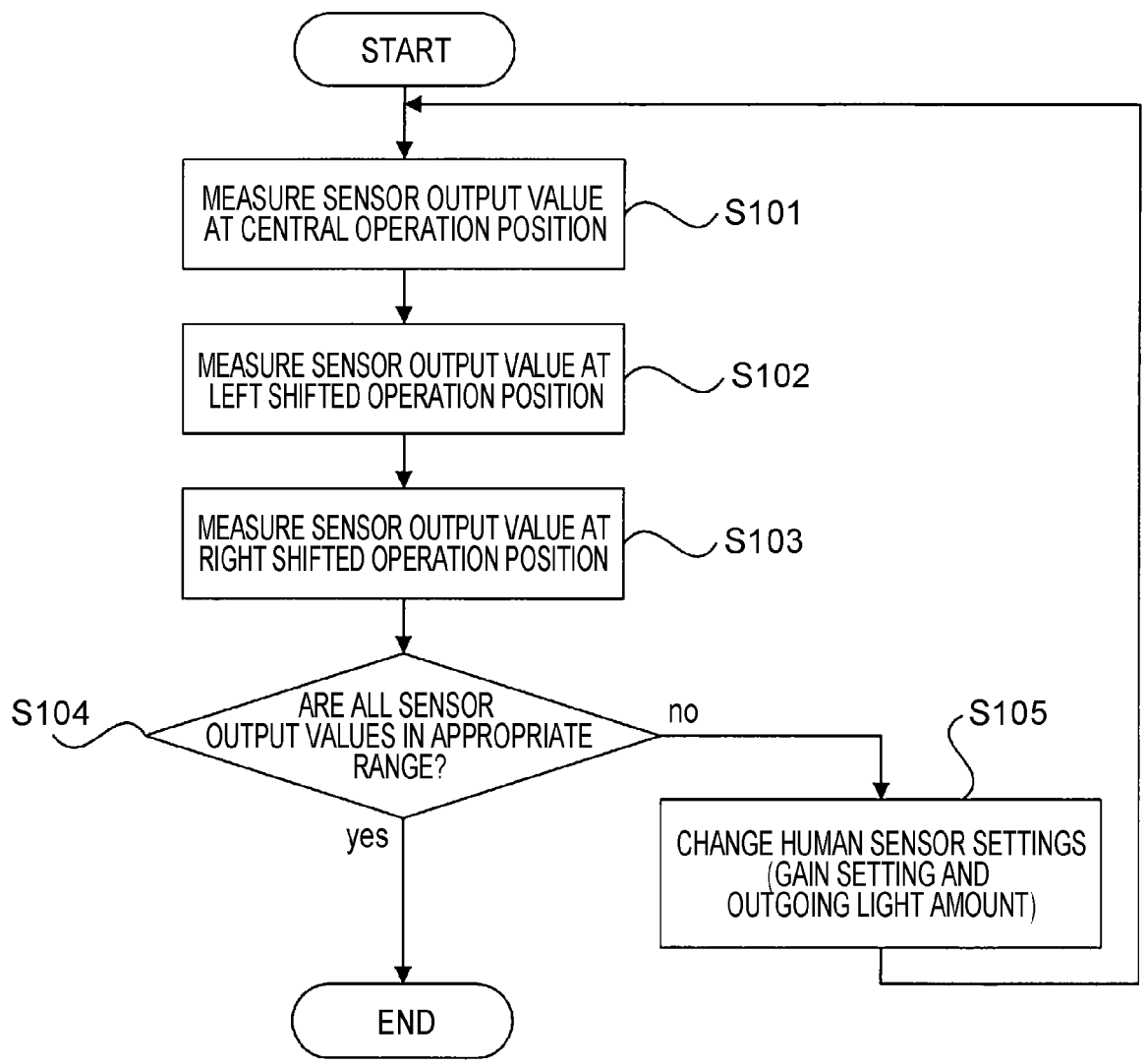
FIG. 11 is a flowchart for explaining an operation for adjusting detection sensitivity of the human sensor by a sensitivity adjustment unit.

An operation for adjusting the detection sensitivity of the human sensor 32 performed by the sensitivity adjustment unit 33 will be described with reference to a flowchart in FIG. 11.

The detection sensitivity is adjusted to enable the human sensor 32 to detect a user in any of the following cases: where the user is present at a central operation position serving as the center of the range intended to be detected by the human sensor 32; where the user is present at a left shifted operation position shifted leftwards from the range intended to be detected by the human sensor 32; and where the user is present at a right shifted operation position shifted rightwards from the range intended to be detected by the human sensor 32.

First, in step S101, the sensitivity adjustment unit 33 measures an output value of the human sensor 32 in a state where a human body or an object for adjustment is placed at the central operation position.

In step S102, the sensitivity adjustment unit 33 then measures an output value of the human sensor 32 in a state where the human body or the object for adjustment is placed at the left shifted operation position.

In step S103, the sensitivity adjustment unit 33 then measures an output value of the human sensor 32 in a state where the human body or the object for adjustment is placed at the right shifted operation position.

In step S104, the sensitivity adjustment unit 33 thereafter determines whether all of the output values measured at the three operation positions are in an appropriate range. If it is verified that all of the output values are in the appropriate range, the sensitivity adjustment is terminated.

If it is determined that even one of the three output values measured at the three operation positions is not in the appropriate range in step S104, the sensitivity adjustment unit 33 changes a gain setting and an outgoing light amount of the human sensor 32 in step S105. The processing returns to step S101 and repeats the measurement of the output values.

Figure 12:
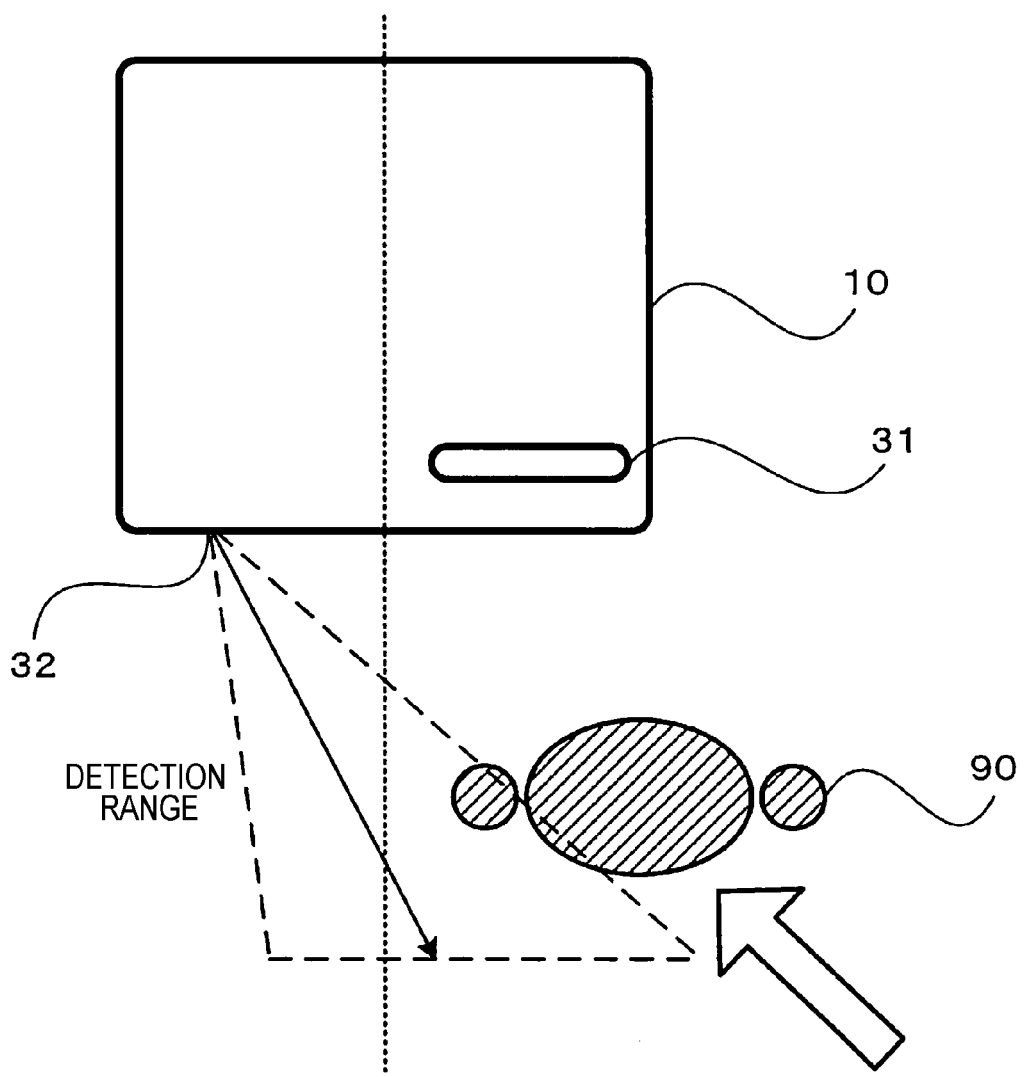
FIG. 12 is a view for explaining a state where the detection range is changed with the detection direction of the human sensor being fixed.

FIG. 12 illustrates an example in which the detection range is changed, for example, by adjusting the detection sensitivity in the case where the detection direction of the human sensor 32 is fixed.

With reference to FIG. 12, it is understood that even though the detection direction of the human sensor 32 is not changed, the detection range of the human sensor 32 is set to detect the user 90 present at least partially outside the width range of the image forming apparatus 10.

Also in the state in FIG. 12, if the user 90 is present at the position where the user 90 is able to operate the operation panel 31 within their reach, the detection range of the human sensor 32 may be set to partially overlap with the body of the user 90 from the viewpoint of detection accuracy. Nevertheless, to minimize wrong detection, the detection range of the human sensor 32 may be set within the width range of the image forming apparatus 10.

Figure 13:
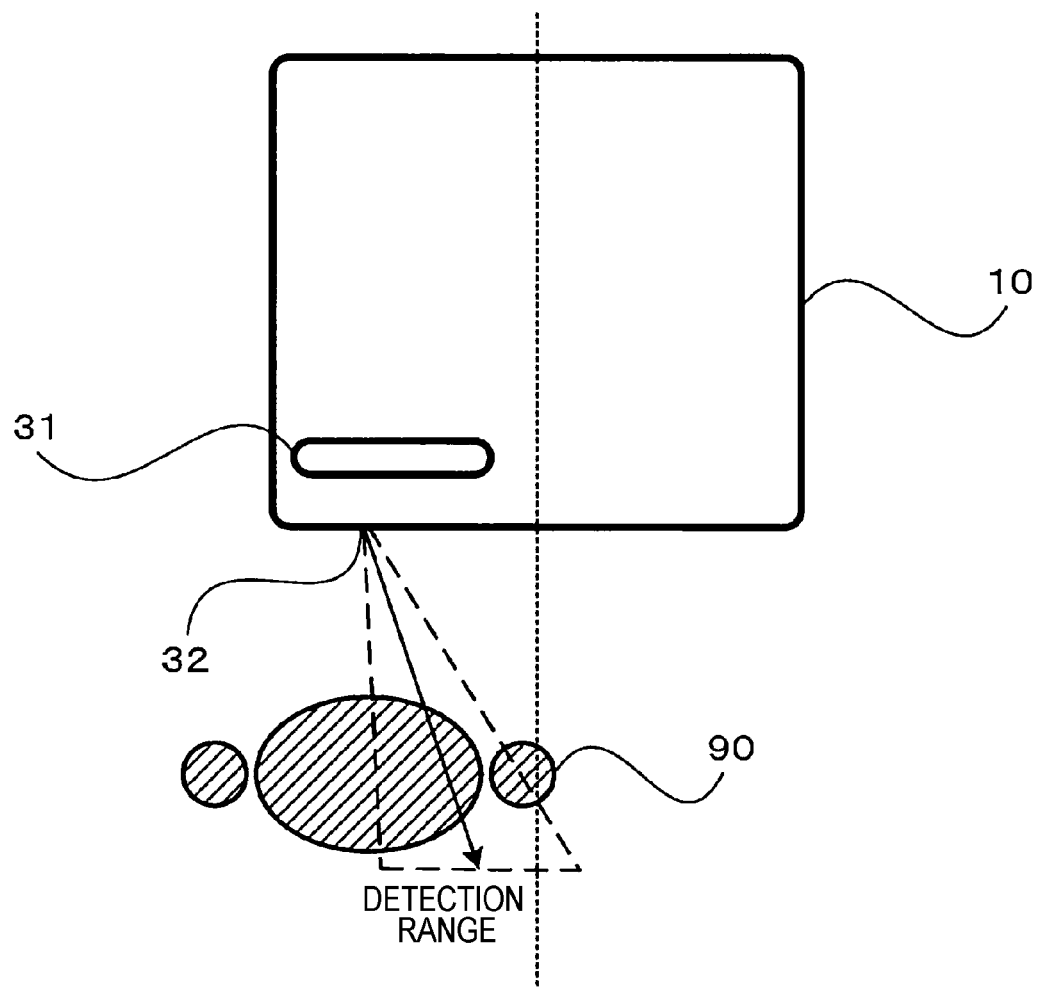
FIG. 13 is a view illustrating the detection range of the human sensor in a state where the operation panel is disposed in the left part of the image forming apparatus viewed from the front face of the image forming apparatus and is disposed closer to the front face.

FIG. 13 illustrates a state where the operation panel 31 is disposed in the left part of the image forming apparatus 10 viewed from the front face and is disposed closer to the front edge. In the description of the image forming apparatus 10 in this exemplary embodiment, the human sensor 32 is disposed in the left part of the image forming apparatus 10. In a case where the operation panel 31 is disposed in the left part of the image forming apparatus 10, the detection direction is set to make an angle close to 90 degrees with the front face of the image forming apparatus 10. The detection direction of the human sensor 32 may be set to make an angle of 90 degrees with the front face of the image forming apparatus 10.

Also in the state in FIG. 13, if the user 90 is present at the position where the user 90 is able to operate the operation panel 31 within their reach, the detection range of the human sensor 32 may be set to partially overlap with the body of the user 90 from the viewpoint of detection accuracy. Nevertheless, to minimize wrong detection, the detection range of the human sensor 32 may be set within the width range of the image forming apparatus 10.

In this exemplary embodiment, the case where the human sensor 32 is disposed in the left part of the image forming apparatus 10 has heretofore been described taken as an example; however, in a case where the human sensor 32 is disposed in the right part of the image forming apparatus 10 or near the center plane between the right part and the left part, the detection direction and the detection range are also set on the basis of the disposition position of the operation panel 31 in the same manner.

Figure 14:
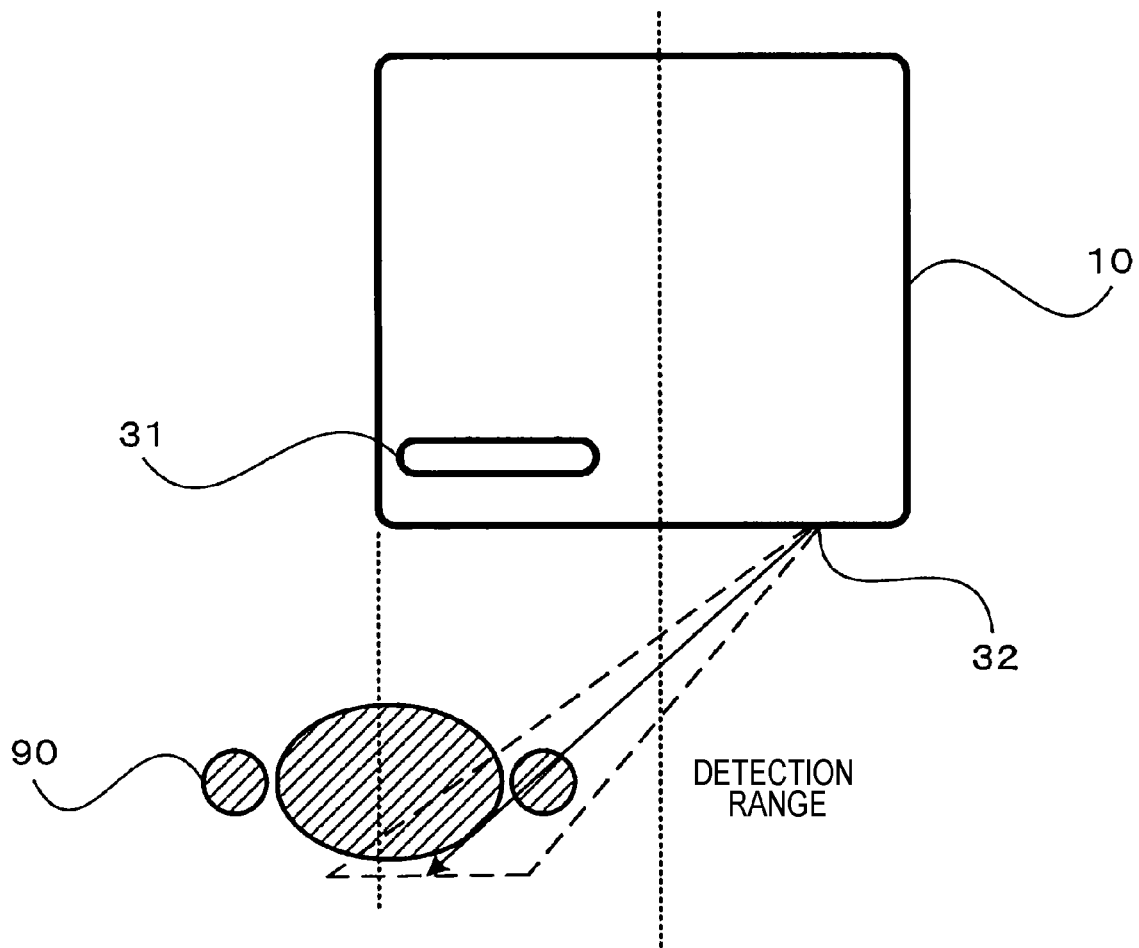
FIG. 14 is a view for explaining a state where the human sensor is disposed in the right part of the image forming apparatus and where the operation panel is disposed in the left part of the upper part of the image forming apparatus and closer to the front face.

FIG. 14 illustrates, for example, a state where the human sensor 32 is disposed in the right part of the image forming apparatus 10 and the operation panel 31 is disposed in the left part of the upper part of the image forming apparatus 10 and closer to the front edge.

With reference to FIG. 14, it is understood that disposition of the operation panel 31 in the left part of the upper part of the image forming apparatus 10 and closer to the front edge causes the detection direction of the human sensor 32 installed in the right part of the image forming apparatus 10 to be changed to the right direction, and thus the detection range of the human sensor 32 is set to detect the user 90 present at least partially outside the width range of the image forming apparatus 10.

Also in the state in FIG. 14, if the user 90 is present at the position where the user 90 is able to operate the operation panel 31 within their reach, the detection range of the human sensor 32 may be set to partially overlap with the body of the user 90 from the viewpoint of detection accuracy. Nevertheless, to minimize wrong detection, the detection range of the human sensor 32 may be set within the width range of the image forming apparatus 10.

A case where the operation panel 31 is disposed closer to the rear edge of the upper part of the image forming apparatus 10 will be described with reference to FIGS. 15 and 16.

Figure 15:
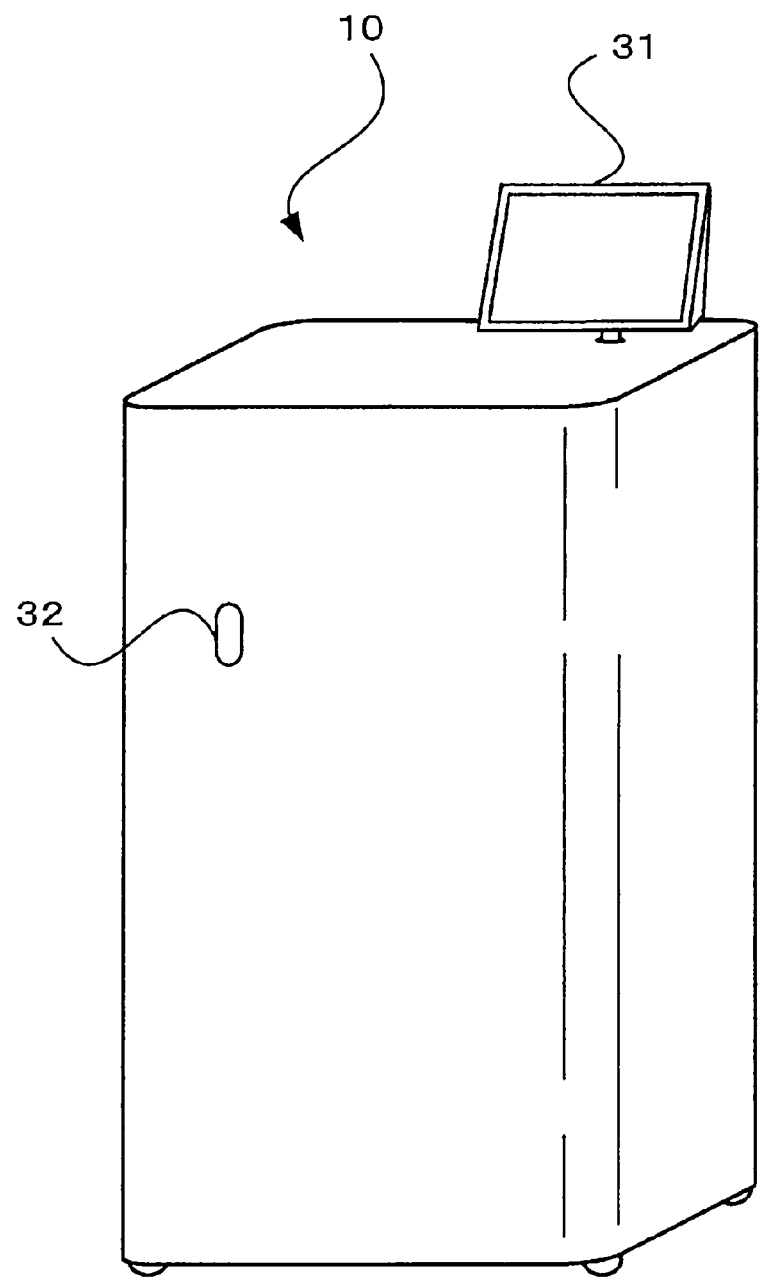
FIG. 15 is a view illustrating a state where the operation panel is disposed in the right part of the image forming apparatus viewed from the front face of the image forming apparatus and is closer to the rear face.

FIG. 15 illustrates a state where the operation panel 31 is disposed in the right part of the image forming apparatus 10 viewed from the front face and is disposed closer to the rear edge.

Figure 16:
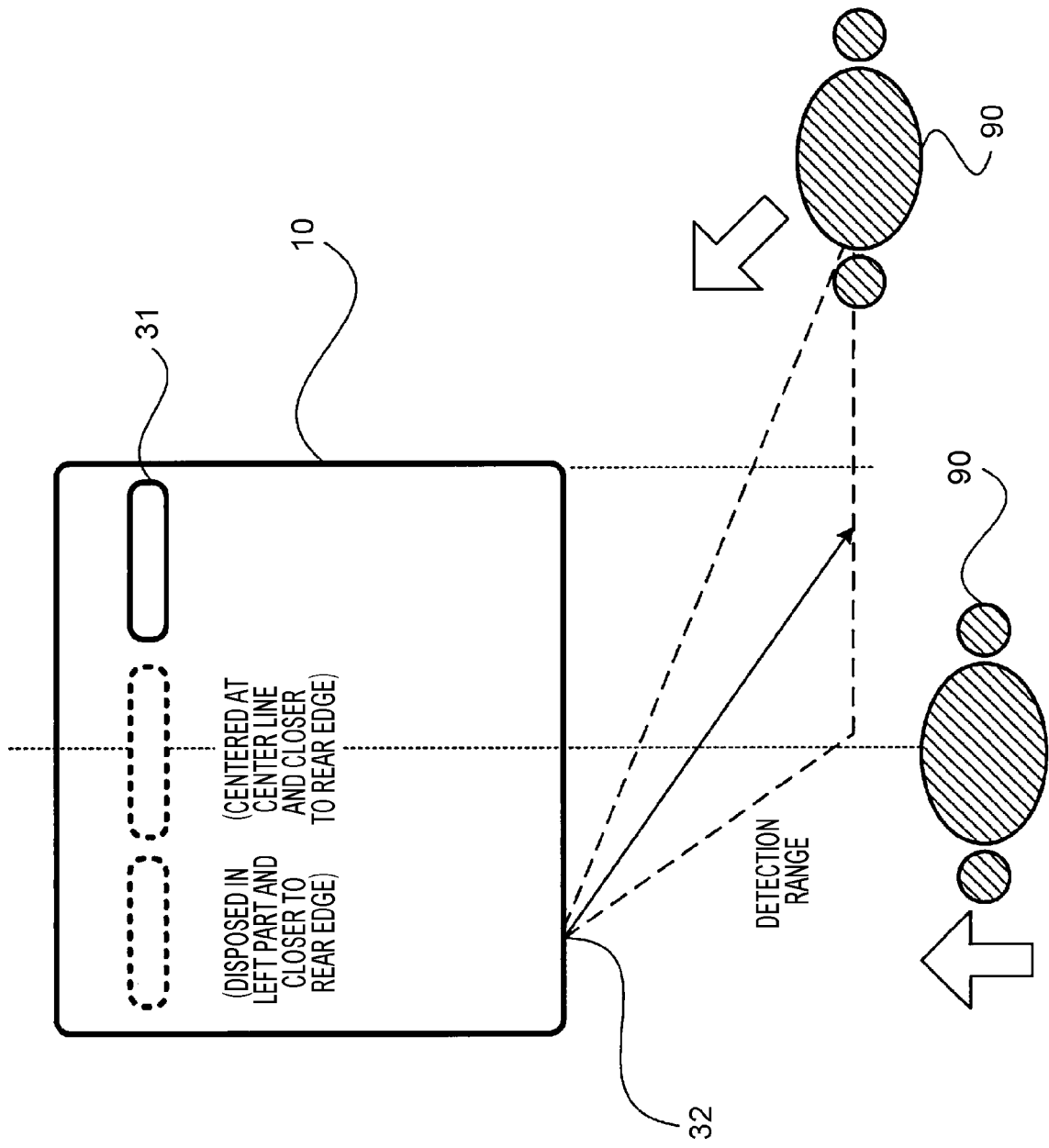
FIG. 16 is a view illustrating the detection range of the human sensor in a state where the operation panel is disposed in the right part of the image forming apparatus viewed from the front face of the image forming apparatus and is closer to the rear face.

FIG. 16 illustrates the detection range of the human sensor 32 set in the case where the operation panel 31 is disposed at the position as described above. It is assumed that the disposition of the operation panel 31 closer to the rear edge causes the user 90 to approach the image forming apparatus 10 toward a lateral face on occasions. The detection range of the human sensor 32 is thus set to detect a range farther from the center line than the detection range for the operation panel 31 disposed closer to the front edge.

In FIG. 16, thick dotted lines represent respective positions where the operation panel 31 is centered at the center line and disposed closer to the rear edge and where the operation panel 31 is disposed in the left part and closer to the rear edge. In the cases where the operation panel 31 is disposed at the positions described above, the detection direction and the detection range of the human sensor 32 are also set to be optimum on the basis of the disposition positions.

If the operation panel 31 is disposed closer to the rear edge in the image forming apparatus 10, and even if the operation panel 31 is disposed in the left part or in the right part of the image forming apparatus 10, it is more highly possible that the user 90 operates the image forming apparatus 10 at the central operation position than in the case where the operation panel 31 is disposed closer to the front edge. In addition, it is also assumed that if the operation panel 31 is disposed closer to the rear edge in the image forming apparatus 10, the user 90 approaches the image forming apparatus 10 toward a lateral face.

In FIG. 16, the detection range of the human sensor 32 is thus set wide. The user 90 facing the front face and approaching the image forming apparatus 10 may thus be detected. In addition, the detection range is set not to be limited to the width range of the image forming apparatus 10, and thus the user 90 approaching the image forming apparatus 10 toward the lateral face may also be detected. Nevertheless, setting the wide detection range naturally leads to an increase in wrong detection by which an unintended user is detected.

Also in the state in FIG. 16, if the user 90 is present at the position where the user 90 is able to operate the operation panel 31 within their reach, the detection range of the human sensor 32 may be set to partially overlap with the body of the user 90 from the viewpoint of detection accuracy. Nevertheless, to minimize wrong detection, the detection range of the human sensor 32 may be set within the width range of the image forming apparatus 10.

In the description above for this exemplary embodiment, one human sensor 32 detects the user who intends to use the image forming apparatus 10. However, the present disclosure is not limited to this case and includes a case where two human sensors detect the user.

For example, the presence of the user may be detected by two human sensors: a distance measuring sensor such as the human sensor 32; and a pyroelectric sensor capable of detecting the presence of the user nearby in a wide detection range. The following configuration may be employed. The distance measuring sensor is set to enter into a standby state in the energy save mode because the distance measuring sensor has high power consumption for emitting detection light from the distance measuring sensor, while only the pyroelectric sensor detects the user approaching the image forming apparatus 10. In response to the pyroelectric sensor detecting the user, the distance measuring sensor becomes active and measures a distance to the user.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
   an operation unit that is decentered from a center line between a right part and a left part of the image forming apparatus rightwards or leftwards and that is disposed closer to a rear face or a front face of the image forming apparatus;
   a human sensor that detects a user intending to use the image forming apparatus; and
   a controller that performs control of operation of the image forming apparatus by using a detection result of the human sensor,
   the human sensor having a detection range set to detect the user, the user being detectable even when the user is present at least partially outside a width range of the image forming apparatus,
   wherein the detection range in which the user present at least partially outside the width range of the image forming apparatus is detectable is settable by changing a detection direction of the human sensor, and wherein the detection direction of the human sensor is changeable stepwise to a detection direction selected from a plurality of detection directions of the human sensor.

2. The image forming apparatus according to claim 1, further comprising:
a changing device that changes the detection direction of the human sensor,
wherein the controller sets the detection range by performing control of the changing device on a basis of a disposition position of the operation unit.

3. The image forming apparatus according to claim 2, further comprising:
an adjustment unit that adjusts detection sensitivity of the human sensor after the detection direction of the human sensor is decided.

4. The image forming apparatus according to claim 3, wherein the human sensor is a distance measuring sensor that detects a distance to the user by detecting reflected radiated light.

5. The image forming apparatus according to claim 2, wherein the human sensor is a distance measuring sensor that detects a distance to the user by detecting reflected radiated light.

6. The image forming apparatus according to claim 5, wherein in response to the distance to the user measured by the distance measuring sensor becoming shorter than or equal to a distance set in advance, the controller performs control to restore a mode of the image forming apparatus from an energy save mode to a normal operation mode.

7. The image forming apparatus according to claim 1, further comprising:
an adjustment unit that adjusts detection sensitivity of the human sensor after the detection direction of the human sensor is decided.

8. The image forming apparatus according to claim 7, wherein the human sensor is a distance measuring sensor that detects a distance to the user by detecting reflected radiated light.

9. The image forming apparatus according to claim 1, further comprising: an adjustment unit that adjusts detection sensitivity of the human sensor after the detection direction of the human sensor is decided.

10. The image forming apparatus according to claim 9, wherein the human sensor is a distance measuring sensor that detects a distance to the user by detecting reflected radiated light.

11. The image forming apparatus according to claim 1, wherein the human sensor is a distance measuring sensor that detects a distance to the user by detecting reflected radiated light.

12. The image forming apparatus according to claim 11, wherein in response to the distance to the user measured by the distance measuring sensor becoming shorter than or equal to a distance set in advance, the controller performs control to restore a mode of the image forming apparatus from an energy save mode to a normal operation mode.

13. The image forming apparatus according to claim 1, wherein the human sensor is a distance measuring sensor that detects a distance to the user by detecting reflected radiated light.

14. The image forming apparatus according to claim 13, wherein in response to the distance to the user measured by the distance measuring sensor becoming shorter than or equal to a distance set in advance, the controller performs control to restore a mode of the image forming apparatus from an energy save mode to a normal operation mode.

* * * * *